(12) United States Patent
Shibata et al.

(10) Patent No.: US 6,338,889 B1
(45) Date of Patent: Jan. 15, 2002

(54) OPTICAL INFORMATION RECORDING MEDIUM

(75) Inventors: Michihiro Shibata; Toshihiko Miura; Takashi Suda, all of Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/531,758

(22) Filed: Mar. 20, 2000

(30) Foreign Application Priority Data

Mar. 19, 1999 (JP) .......................................... 11-076487

(51) Int. Cl.⁷ ................................................. B32B 3/02
(52) U.S. Cl. ..................... 428/64.4; 428/64.4; 428/402; 430/270.11
(58) Field of Search ............................... 428/64.1, 64.2, 428/64.4, 402, 913; 430/270.11, 495.1, 945; 369/283, 288

(56) References Cited

U.S. PATENT DOCUMENTS

| | | | | | |
|---|---|---|---|---|---|
| 5,549,952 | A | * | 8/1996 | Arai | 428/64.4 |
| 5,599,649 | A | * | 2/1997 | Shinkai | 430/270.11 |
| 5,616,447 | A | * | 4/1997 | Arioka | 439/270.11 |
| 5,705,247 | A | * | 1/1998 | Arai | 428/64.1 |

* cited by examiner

*Primary Examiner*—Elizabeth Evans
(74) *Attorney, Agent, or Firm*—Sughrue Mion, PLLC

(57) ABSTRACT

An optical information recording disc is composed a transparent substrate, an information recording layer, a metallic light-reflecting layer, a light-shielding layer, and an ink-printable layer, in order. The light-shielding layer is prepared essentially from a binder polymer and zinc sulfide particles, so that an ink, particularly an aqueous ink solution, applied onto the ink-printable layer gives a clear ink image with almost no blur.

18 Claims, No Drawings

OPTICAL INFORMATION RECORDING MEDIUM

FIELD OF THE INVENTION

This invention relates to an optical information recording medium such as a compact disc (namely, CD), a digital video disc (namely, DVD), a recordable compact disc (namely, CD-R) or a recordable digital video disc (namely, DVD-R). In particular, the invention relates to an optical information recording medium having an ink-printable layer on its surface, on which letters and a graphic image can be printed.

BACKGROUND OF THE INVENTION

An optical information recording medium on which information can be only once recorded by means of a laser beam (i.e., an optical disc of write-once type) is known as a recordable compact disc (CD-R), and is widely used in practice. The optical disc of CD-R type generally has a multi-layered structure typically comprising a disc-shaped transparent substrate (support), a recording layer comprising an organic dye (often referred to as "recording dye layer"), a light-reflecting layer comprising a metal (hereinafter, often referred to as "metallic light-reflecting layer", or simply "reflecting layer"), and optionally a protective layer made of resin overlaid in order.

A demand for large recording capacity has recently increased, but an optical disc of CD-R type does not have satisfactorily large information-recording capacity. Therefore, an optical disc having satisfactorily large information-recording capacity has been studied and proposed. For example, a recordable DVD (i.e., recordable digital video disc, DVD-R), in which information can be recorded on and read out from by means of a laser beam having a shorter wavelength than that for CD-R, has been developed. The optical disc of DVD-R type is formed by laminating two composites having a layered structure. Each of the layered composites comprises a transparent disc substrate provided with a guide groove (i.e., pregroove) for tracking of the laser beam, a recording layer comprising an organic dye, a light-reflecting layer, and a protective layer arranged in order. The layered composites are combined with an adhesive so that the recording layers would be placed inside. Otherwise, the optical disc of DVD-R type is formed by combining a protective disc plate and the layered composites comprising a substrate, a recording layer, a light-reflecting layer, and a protective layer arranged in order.

For writing (i.e., recording) and reading (i.e., reproducing) the information, a CD-R is irradiated with a laser beam having a wavelength in the range of 770 to 790, typically approx. 780 nm, while a DVD-R is irradiated with a laser beam of visible wavelength region (generally having a wavelength of 600 to 700 nm). By the irradiation of the laser beam, irradiated area of the recording dye layer is locally heated to change its physical or chemical characteristics, and therefore pits are formed in the irradiated area of the recording layer. Since the optical characteristics of the formed pits are different from those of the area having been not irradiated, the digital information is recorded. The recorded information can be read by a reproducing procedure generally comprising the steps of irradiating the recording layer with a laser beam having the same wavelength as that employed in the recording procedure, and detecting the light-reflection difference between the pits and their periphery.

Most of optical information recording discs such as CD-R and DVD-R have on one side a surface on which letters and a graphic image are printed, so that the contents or recorded information can be easily read. For the printing, an ink-jet printer is most generally employed, because it can give a color image using an aqueous color ink by means of a relatively simple printer mechanism.

Japanese Patent Provisional Publication No. 11-162438 describes an optical information recording medium of CD-R type which has a hydrophilic surface layer comprising a resin layer derived from an acrylate monomer and a protein powder. The hydrophilic surface layer serves to receive thereon an aqueous ink for printing letters and a graphic image. The protein powder is stated to serve for fixing the aqueous ink on the surface layer and further to increase whiteness of the disc surface.

In the CD-R recording disc typically, metallic glitter of the metallic light-reflecting layer comprising gold, silver, or the like, is observed through the generally transparent surface layer, and therefore it sometimes becomes difficult to read letters or a graphic image printed on the transparent surface layer under the glittering background. The above-mentioned patent provisional publication proposes that a white pigment-containing layer be placed between the metallic light-reflecting layer and the ink-printable layer. A representative example of the white pigment is titanium dioxide.

Japanese Utility Model publication No. 3021164 indicates that a light-shielding layer is provided between the metallic light-reflecting layer and the hydrophilic layer for ink-printing. In more detail, under a hydrophilic resin layer comprising a ultraviolet curing resinous composition, a polyvinyl pyrrolidone fine powder and a silica fine powder is provided a light-shielding layer comprising a ultraviolet curing resin composition and a white pigment.

A compact disc (i.e., CD) or a digital vide disc (i.e., DVD) comprising a transparent substrate disc, a recording layer (i.e., recording surface) on which information is already recorded, and a metallic light-reflecting layer also has a surface on which letters and a graphic image indicating the content of the disc is printed. Generally, the letters and a graphic image are printed already on the surface by screen printing. However, it may be convenient to further print additional information on the already printed surface of CD or DVD.

The present inventors have made studies on the ink-printable surface layer of an optical information recording medium and noted that the known hydrophilic surface layer is apt to show blur of an ink phase around the printed letters and image when the ink is printed thereon and kept for a long time under atmospheric conditions.

Accordingly, it is an object of the present inventors to provide an optical information recording medium such as CD-R, DVD-R, CD or DVD which have a surface layer on which an ink, particularly an aqueous ink composition, is clearly printed, and the clearly printed ink image is kept with almost no blur under atmospheric conditions for a long storage period.

SUMMARY OF THE INVENTION

It has been now discovered by the inventors that the troublesome blur of the printed ink observed on the ink-printable layer after a long term storage under atmospheric conditions is effectively prevented by utilizing a zinc sulfide fine powder as a white pigment for the incorporation into the light-shielding layer. Further, the use of a zinc sulfide fine powder as the white pigment in the light-shielding layer is effective to ensure to form a clear printed image on the uppermost ink-printable surface layer.

Accordingly, the present invention resides in an optical information recording medium comprising a transparent substrate, an information recording layer, a metallic light-reflecting layer, a light-shielding layer, and an ink-printable layer, in order, wherein the light-shielding layer comprises a binder polymer and zinc sulfide particles.

In the optical information recording medium of the invention, the zinc sulfide particles preferably have a mean particle size of 0.05 to 5 μm, particularly 0.1 to 1.0 μm. The binder polymer in the light-shielding layer preferably is a cured ultraviolet light-curing resin.

The light-shielding layer preferably has a thickness of 8.0 to 11.5 μm, particularly 8.0 to 10.0 μm, more preferably 8.0 to 9.5 μm, and the binder polymer and the zinc sulfide particles are present in the light-shielding layer in a ratio of 10:90 to 50:50.

DETAILED DESCRIPTION OF THE INVENTION

The optical information recording medium of the invention comprises a transparent substrate, an information recording layer, a metallic light-reflecting layer, a light-shielding layer, and an ink-printable layer, and the light-shielding layer comprises a binder polymer and zinc sulfide particles.

The ink-printable layer preferably is an aqueous ink-printable layer comprising a hydrophilic material and a binder polymer, and the aqueous ink-printable layer preferably comprises a cured ultraviolet light-curing resin and protein particles.

The aqueous ink-printable layer preferably has a thickness more than that of the light-shielding layer and, for instance, has a thickness 1.6 to 2.5 times (preferably 1.7 to 2.0 times, more preferably 1.75 to 1.9 times) as much as the thickness of the light-shielding layer. The aqueous ink-printable layer preferably has a thickness of 14.0 to 18.0 μm, more preferably 14.0 to 17.0 μm, most preferably 14.5 to 15.5 μm.

The metallic light-reflecting layer preferably comprises silver metal or silver alloy.

The optical information recording medium of the invention preferably has an information recording layer comprises a laser light-sensitive dye, that is, CD-R or DVD-R. The optical information recording disc of CD-R type or DVD-R type of the invention comprises a transparent disc substrate provided with a spiral pregroove, a recording dye layer on which information is recorded by irradiation with a laser beam, and a metallic light-reflecting layer overlaid in order. The structures of the CD-R and DVD-R are already known.

The optical information recording disc of CD-R type or DVD-R type according to the invention can be produced from the materials which have been conventionally used for producing a CD-R or a DVD-R. The DVD-R can be produced by combining, via an adhesive, two layered composites, each of which comprises a substrate, a recording dye layer, a metallic light-reflecting layer, and if desired a protective layer arranged in order, so that the recording dye layers would be placed inside. Otherwise, the DVD-R can be also produced by combining, via an adhesive, the aforementioned layered composite and a disc protective plate having almost the same shape as the substrate.

The transparent substrate including the disc protective plate for the DVD-R (hereinafter, often referred to as "protective substrate") can be made of any of materials known as those for producing the substrate of the known optical information recording medium. Examples of the materials include glass, polycarbonate, acrylic resins such as polymethyl methacrylate, vinyl chloride resins such as polyvinyl chloride and vinyl chloride copolymer, epoxy resins, amorphous polyolefins, and polyesters. These materials can be employed in combination, if desired. The materials are molded to give a sheet or a rigid plate. Polycarhonate is most preferred from the viewpoints of humidity resistance, dimensional stability, and production cost.

A disc substrate for CD-R generally has a diameter of 120±3 mm and a thickness of 1.2±0.1 mm or has a diameter of 80±3 mm and a thickness of 1.2±0.1 mm.

A disc substrate for DVD-R generally has a diameter of 120±3 mm and a thickness of 0.6±0.1 mm or has a diameter of 80±3 mm and a thickness of 0.6±0.1 mm.

The substrate may have an undercoating layer on its surface of the recording layer side, so as to enhance surface smoothness and good adhesion and further to keep the recording dye layer from damage. Examples of the materials for the undercoating layer include polymers such as polymethyl methacrylate, acrylate-methacrylate copolymer, styrene-maleic anhydride copolymer, polyvinyl alcohol, N-methylolacrylamide, styrene-vinyltoluene copolymer, chloro-sulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate, and surface treating agents such as a silane-coupling agent.

The undercoating layer can be formed by applying a coating solution (in which one or more of the above-mentioned materials are dissolved or dispersed) onto the surface of the substrate by the known coating methods such as spin-coat, dip-coat, and extrusion-coat. The undercoating layer generally has a thickness of 0.005 to 20 μm, preferably 0.01 to 10 μm.

On the surface of the substrate or on the undercoating layer, a spiral pregroove for tracking or giving address signals is formed. The pregroove is preferably formed directly on the surface of the substrate when the substrate is molded from polymer material by injection or extrusion. For instance, a stamper can be employed for the preparation of the substrate of the optical information disc of the invention.

Alternatively, the pregroove can be provided on the surface of the substrate by placing a pregroove layer. The pregroove layer can be produced from a mixture of a monomer (such as monoester, diester, triester and tetraester) of acrylic acid (or its oligomer) and a photo-polymerization initiator. The pregroove layer can be produced by the steps of coating a precisely produced stamper with a mixture of the polymerization initiator and a monomer such as the above-mentioned acrylic ester, placing a substrate on the formed layer, and irradiating the formed layer with ultraviolet rays through the stamper or the substrate so as to cure the coated layer as well as to combine the cured layer and the substrate. The substrate to which the cured layer is attached is separated from the stamper, to give the desired substrate equipped with a pregroove layer. The thickness of the pregroove layer is generally in the range of 0.05 to 100 μm, preferably in the range of 0.1 to 50 μm.

For the CD-R, the pregroove formed on the substrate preferably has a depth of 10 to 300 nm and a half-width of 200 to 950 nm. A generally adopted track pitch can be also adopted to the CD-R of the invention.

For the DVD-R, the pregroove formed on the substrate preferably has a track pitch of 0.3 to 0.9 μm (more preferably 0.4 to 0.8 μm), a depth of 50 to 250 nm (more preferably 80 to 220 nm, further preferably 100 to 200 nm), and a half-width of 100 to 450 nm (more preferably 150 to 400 nm, further preferably 200 to 350 nm). A depth of 150 to 200 nm of the pregroove is preferably adopted because such pregroove can enhance the sensitivity without decreasing the light-reflection on the substrate. The optical disc having such pregroove shows a high sensitivity, and hence is employable even in a recording system using a laser beam of low power. This means that a semiconductor laser of low output power can be employed, and the life of semiconductor laser can be prolonged.

On the substrate provided with the pregroove, the recording dye layer is placed. The dye employed for the recording layer is not particularly restricted, but dyes having a high absorption at a wavelength of the laser beam are preferred. Dyes employed for conventional optical information recording media are employable. Examples of the dyes include cyanine dyes, phthalocyanine dyes, imidazoquinoxaline dyes, pyrylium/thiopyrylium dyes, azulenium dyes, squarilium dyes, metal (e.g., Ni, Cr) complex dyes, naphthoquinone dyes, anthraquinone dyes, indophenol dyes, merocyanine dyes, oxonol dyes, naphthoaniline dyes, triphenylmethane dyes, triallylmethane dyes, aminium/diimmonium dyes, and nitroso compounds. Preferred are cyanine dyes, phthalocyanine dyes, azulenium dyes, squarilium dyes, oxonol dyes, and imidazoquinoxaline dyes. More preferred are cyanine dyes.

The recording dye layer generally has a thickness of 20 to 500 nm, preferably 50 to 300 nm.

The recording dye layer can be formed by the steps of dissolving the dye and, if desired an anti-fading agent and a binder in a solvent to prepare a coating solution, applying the coating solution on the substrate provided with a pregroove to form a dye layer, and then drying the formed dye layer. Examples of the solvents employable for the coating solution include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexanone; ethers such as tetrahydrofuran, diethyl ether and dioxane; alcohols such as ethanol, n-propanol, isopropanol, n-butanol, and diacetone alcohol; fluorine-containing solvents such as 2,2,3,3-tetrafluoropropanol; and glycol ethers such as ethyleneglycol monomethyl ether, ethyleneglycol monoethyl ether, and propyleneglycol monomethyl ether. These solvents may be employed singly or in combination, in consideration of the solubility of the used compounds in the solvent. The coating solution can further contain auxiliary additives such as an oxidation inhibitor, a UV absorber, a plasticizer, and a lubricant.

Examples of the anti-fading agents include nitroso compounds, metal complexes, diimmonium salts, and aluminum salts. These examples are described, for example, in Japanese Patent Provisional Publications No. 2-300288, No. 3-224793 and No. 4-146189. In the case that the anti-fading agent is added to the coating solution, the amount of the agent is in the range of 0.1 to 50 wt. %, preferably 0.5 to 45 wt. %, more preferably 3 to 40 wt. %, further preferably 5 to 25 wt. %, based on the amount of the dye.

Examples of the binders include natural-origin polymers such as gelatin, cellulose derivatives, dextran, rosin, and rubber; hydrocarbon polymer resins such as polyurethane, polyethylene, polypropylene, polystyrene and polyisobutyrene; vinyl polymers such as polyvinyl chloride, polyvinylidene chloride, and vinyl chloridevinyl vinyl acetate copolymer; acrylate polymers such as polymethyl acrylate and polymethyl methacrylate; polyvinyl alcohol, chlorinated polyethylene; epoxy resins; butyral resins, rubber derivatives, and thermosetting resins such as prepolymers of phenol-formaldehyde. The amount of the binder may be in the range of 0.2 to 20 weight parts (preferably 0.5 to 10 weight parts, further preferably 1 to 5 weight parts) based on 100 weight parts of the dye. The concentration of the dye in the coating solution generally is in the range of 0.01 to 10 wt. %, preferably 0.1 to 5 wt. %.

The coating can be performed by the known methods such as spray coat, spin coat, dip coat, roller coat, blade coat, doctor roller coat and screen print. The recording dye layer can be a single layer or can comprise plural layers.

On the recording dye layer, the metallic light-reflecting layer is placed so as to enhance the light-reflection in the course of recording or reproducing information.

The light-reflecting layer should show a high reflection to the laser light. Examples of the metallic light-reflecting materials include metals and sub-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel film is also employable. Preferred are Cr, Ni, Pt, Cu, Ag, Au, Al and stainless steel. These materials can be employed singly, in combination, or in the form of alloy. Most preferred are silver metal or silver alloy.

The metallic light-reflecting layer can be formed on the recording layer by, for example, vacuum deposition, sputtering or ion-plating. The thickness of the light-reflecting layer generally is 10 to 800 nm, preferably 20 to 500 nm, further preferably 50 to 300 nm.

On the light-reflecting layer, a protective layer may be provided so as to protect the recording layer and the light-reflecting layer from chemical deterioration or physical damage. In addition to the light-reflecting layer on the light-reflecting layer, another protective layer can be also placed on the substrate on the surface not having the recording dye layer so as to enhance the scratch resistance and the moisture resistance of the medium. The protective layer can be made of inorganic materials such as $SiO$, $SiO_2$, $MgF_2$, $SnO_2$, $Si_3N_4$, or organic materials such as thermoplastic resins, thermo-setting resins, and UV curable resins. On the light-reflecting layer and/or the substrate, the protective layer can be formed by laminating a film of plastic material with an adhesive. The inorganic material can be also placed on the light-reflecting layer and/or the substrate by vacuum deposition or sputtering. Otherwise, the organic polymer material layer can be formed by the steps of dissolving the polymer material in an appropriate solvent to prepare a coating solution, applying the coating solution to form a polymer material layer, and then drying the formed polymer material layer to give the protective layer. For example, a UV curable resin is dissolved in a solvent and applied onto the light-reflecting layer and/or the substrate, and then cured by applying ultraviolet rays to the formed resin layer. The protective layer can contain various additives such as an anti-static agent, an oxidation inhibitor and a ultraviolet absorber. The thickness of the protective layer generally is in the range of 0.1 to 100 μm.

On the protective layer, a light-shielding layer comprising a binder polymer and zinc sulfide particles is placed.

On the protective layer, the light-shielding layer comprising zinc sulfide particles and a polymer binder is placed. The polymer binder preferably is prepared in situ from a ultraviolet curing resin. A solution of the ultraviolet curing resin and the zinc sulfide particles in an appropriate organic solvent is coated on the protective layer, for instance, by a screen printing method and dried, and the curing resin is cured in situ by irradiation with ultraviolet rays. The zinc sulfide particles are known white pigments, and can almost completely shield the glittering from the metallic light-reflecting layer. Other pigments can be employed in combination with the zinc sulfide particles. The zinc sulfide particles preferably have a mean size of 0.05 to 5 μm, more preferably 0.1 to 1.0 μm. Examples of the ultraviolet curing resins are described hereinbelow for the preparation of the ink-printable layer.

The light-shielding layer preferably comprises the zinc sulfide particles and the cured ultraviolet curing resin in a ratio of 10:90 to 50:50, preferably 20:80 to 50:50 (particles:resin). The light-shielding layer preferably has a thickness of 8.0 to 11.5 μm, more preferably 8.0 to 10.0 μm, most preferably 8.0 to 9.5 μm.

On the zinc sulfide particle-containing light-shielding layer, an ink-printable layer, preferably an aqueous ink-printable layer, is placed. The ink-printable layer can be formed on a part of the light-shielding layer. The ink-printable layer preferably comprises a pigment (preferably, a hydrophilic pigment, more preferably in the form of water-absorbing particles) and a cured ultraviolet curing resin. In the ink-printable layer, the pigment and the cured resin are preferably incorporated in a ratio of 20:80 to 80:20, more preferably 25:75 to 50:50. The ink-printable layer preferably has a thickness of 6 to 20 Am, more preferably 14 to 18 μm, particularly preferably 14 to 17 μm, most preferably 14.5 to 15.5 μm. The ink-printable layer preferably has a thickness more than that of the light-shielding layer and generally has a thickness 1.6 to 2.5 times (preferably 1.7 to 2.0 times, more preferably 1.75 to 1.9 times) as much as the thickness of the light-shielding layer.

There are no specific limitations with respect to the water-absorbing particles, so far as the particles are hydrophilic and absorb enough amount of water. Preferred are fine particles made of water-absorbing material. Examples of the water-absorbing particles are particles of material of natural origin. Examples of the preferred materials include monosaccharides such as glucose, disaccharides such as sugar and malt sugar, polysaccharides such as cellulose and starch, cellulose esters such as cellulose inorganic acid esters (e.g., cellulose sulfate and cellulose phosphate), cellulose organic acid esters (e.g., cellulose formate and cellulose acetate), and cellulose ethers (carboxymethylcellulose sodium salt and hydroxyethylcellulose), polypeptides of natural origin, and proteins. Preferred are cellulose acetate and protein. Most preferred is protein.

The water-absorbing particles preferably have such an average size that most of the particles incorporated into the ink-printable layer are embedded in the layer and only small portions are exposed on the surface of the water-absorbing layer. Therefore, the particles preferably have an average particle size in the range of 1 to 8 μm, more preferably 3 to 8 μm. The ratio of the average particle size of the water-absorbing particles to the thickness of the ink-printable layer preferably is in the range of 1/5 to 1/1.2, more preferably 1/4 to 1/1.5, most preferably 1/3.5 to 1/2.

The UV curing resin employable for preparation of the ink-printable layer is favorably employed in consideration of productivity. The UV curing resin generally comprises a photopolymerization initiator and a polymerizable compound having at least one reactive acrylic group in the molecule (i.e., a functional monomer or oligomer or mixture of them). Examples of the monofunctional monomers include tetrahydrofurfuryl acrylate, ethylcarbitol acrylate, dicyclopentyloxy acrylate, phenylcarbitol acrylate, nonylphenoxyethylacrylate, hydroxyethyl acrylate, 2-hydroxy-3-phenoxypropyl acrylate, acrylamide, acryloylmorpholine, dimethylacrylamide, diethylacrylamide, and N-vinylpyrrolidone. Examples of the nulti-functional acrylates include polyol polyacrylate, polyester acrylate, epoxy acrylate, urethane acrylate, pentaerythritol di(tri)acrylate, N, N'-methylenebisacrylamide, and hexamethylenebisacrylamide. Preferred are mono- or multi-functional monomers or oligomers having acrylamide group, vinylamino group or polar groups such as hydroxyl group.

Examples of the photopolymerization initiators include benzoin compounds and their ethers (e.g., benzoin, benzoinmethyl ether, benzoinethyl ether, and benzoinisopropyl ether), benzophenone compounds (e.g., benzophenone), benzyl cons (e.g., benzyl, benzylmethyl ketal, benzylethyl ketal), and hydroxyalkylphenyl ketone compounds (e -g., 1-phenyl-2-hydroxy-2-methyl-2-propane).

The zinc sulfide-containing light-shielding layer and ink-printable layer may contain an antistatic agent or an antiseptic agent. Since the light-shielding layer and ink-printable layer generally are hydrophilic, these hydrophilic layers easily get moldy. The incorporation of an antiseptic agent is effective to keep these hydrophilic layer from getting moldy. As the antiseptics, there are no specific restrictions, and those described in Japanese Patent Provisional Publications No. 3-73429 and No. 10-162438 are employable. Typical examples of the antiseptics are a benzimidazole derivative having the following formula [1], a thiopharnate derivative having the following formula [2], a dioxoimidazolidine derivative having the following formula [3], and an isothiazolone derivative having the following formula [4]:

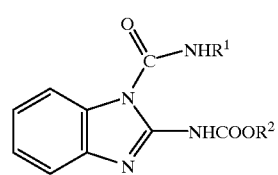

[1]

In the formula [1], $R^1$ is an alkyl group which have 1 to 4 carbon atoms and which may have one or more substituent groups, and $R^2$ is a linear or branched alkyl group having 1 to 4 carbon atoms.

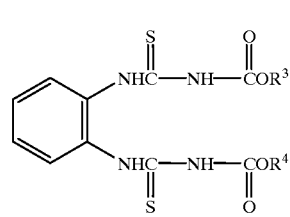

[2]

In the formula [23], each of $R^3$ and $R^4$ is a linear or branched alkyl group having 1 to 4 carbon atoms.

[3]

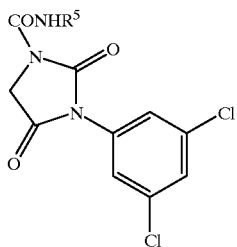

In the formula [3], $R^5$ is a linear or branched alkyl group having 1 to 4 carbon atoms.

[4]

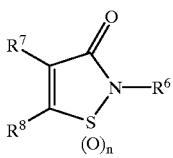

In the formula [4], $R^6$ is a hydrogen atom, an alkyl or alkenyl group having 1 to 18 carbon atoms, a cycloalkyl group, an aryl group, a polycyclic carbon atom group, a heteroaromatic group, or a sulfonylaminocarbonyl group, provided that any of these groups may have one or more substituent groups; R7 is a hydrogen atom, a halogen atom, a cyano group, or a linear or branched alkyl group having 1 to 4 carbon atoms; $R^8$ is a hydrogen atom, a halogen atom, an alkylthio group, a heterocyclic-thio group, an aryl-thio group, an aryl-carbonyl group, an alkoxycarbonyl group, or an aryloxycarbonyl group, provided that any of these groups may have one or more substituent groups; or $R^7$ and $R^8$ may be combined to form a 5- to 7-membered carbon ring; and n is an integer of 0 to 2.

The antiseptic agent can be incorporated into the hydrophilic layer or coated on the hydrophilic layer. The hydrophilic layer preferably contains an antiseptic agent in an amount of 0.2 to 2.0 mg based on 1 g of the hydrophilic layer.

The combination of the zinc sulfide-containing light-shielding layer and the ink-printable layer can be formed in DVD-R media, CD media, and DVD media, in the same manner as above.

Onto the ink-printable layer, an ink, preferably, an aqueous ink, is applied preferably by means of an ink jet printer such as CP-1000X (available from Expert Magnetics Co., Ltd.), Myprint LAB (model MC-006-3, available from MasterMind Co., Ltd.), and CD-R Color Printer Signature (available from Fargo Corp.). Other printing apparatuses such as thermal printers can be also employed. For instance, CD Printer (model CDPR11, available from REMAGE Corp.).

The recording/reproducing procedures are carried out, for example, in the following manner.

The CD-R and DVD-R are made to rotate at a predetermined line rate (1.2 to 1.4 m/sec., in the case of CD format, or a rate of double, 4 times, 6 times, or more) or a predetermined angular velocity. On the rotating disc, a recording light such as a semiconductor laser beam is applied through the transparent substrate. By the application of the laser beam, the irradiated area of the recording layer is heated to change its physical or chemical characteristics. Thus, pits are formed in the recording dye layer, and thereby the information is recorded. The light source preferably is a semiconductor laser having an oscillation frequency in the range of 500 to 850 nm, specifically 600 to 850 nm. More specifically 770 to 790 nm for CD-R, while 600 to 700 nm for DVD-R. The preferred beam wavelength for DVD-R is in the range of 620 to 680 nm (more preferably, 630 to 660 nm).

For DVD-R, the recording light is preferably focused through an optical system having a NA of 0.55 to 0.7. The minimum recording pit length is usually in the range of 0.05 to 0.7 μm (preferably 0.1 to 0.6 μm, more preferably 0.2 to 0.4 μm).

For reproducing thus recorded information, a semiconductor laser beam having the same wavelength as that used in recording is applied through the transparent substrate onto the CD-R or DVD-R rotating at a predetermined line rate, and the reflected light is detected. Using the optical information recording disc of the invention, the information recording and reproducing procedures can be carried out not only at a normal line rate (in the case of CD format) but also at a more high-speed line rate.

The present invention is further described with the following non-restrictive working examples.

EXAMPLE 1

(1) Preparation of Recording Layer on Disc Substrate

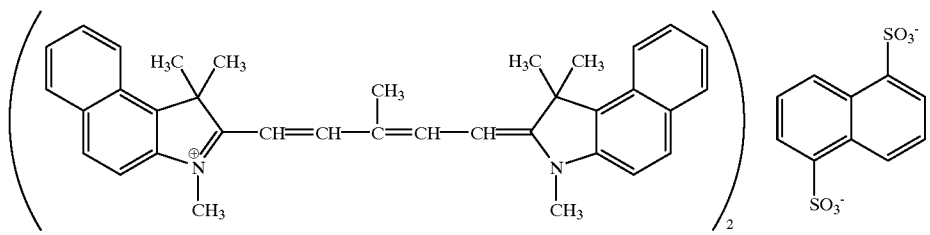

In 100 mL of 2,2,3,3-tetrafluoro-1-propanol was dissolved an indolenine-cyanine dye of the above-illustrated formula, to prepare a coating solution for a recording dye layer. Thus prepared coating solution was then coated by spin-coat on a pregroove (track pitch: 1.6 μm, width: 520 nm, depth: 175 nm) of a polycarbonate disc substrate (diameter: 120 mm, thickness: 1.2 mm).

(2) Preparation of Metallic Light-reflecting Layer On the recording dye layer, a light-reflecting layer of Ag (thickness: approx. 150 nm) was provided by sputtering by means of a DC magnetron sputtering apparatus.

(3) Preparation of Protective Resin Layer A UV curable photopolymer (Diecur Clear SD318 [trade name], available from Dainippon Ink & Chemicals, Inc.) was applied by spin-coat on the light-reflecting layer, and then irradiated with ultraviolet rays to give a protective resin layer of approx. 9 μm thick.

(4) Preparation of Light-shielding Layer On the protective layer was coated by a screen printing method (screen: 350 mesh) a zinc sulfide particle-containing dispersion (which contained an acrylate monomer, prepolymer, a photopolymerization initiator, and a pigment consisting mainly of zinc sulfide particles). The coated dispersion layer was cured by irradiation with ultraviolet rays emitted from a metal halide lamp, to give a zinc sulfide-containing light-shielding layer of approx. 8.5 μm.

(5) Preparation of Aqueous Ink-printable Layer On the light-shielding layer was coated by a screen printing method (screen: 200 mesh) an aqueous ink solution having the following formulation:

| | |
|---|---|
| Acrylate polymer | 33 wt. % |
| Ether acrylate | 17 wt. % |
| Alicyclic monomer | 12 wt. % |
| Photopolymerization initiator | 4 wt. % |
| Pigment (mainly: protein particles) | 28 wt. % |
| Auxiliary components | 6 wt. % |

The coated layer was cured by irradiation with ultraviolet rays emitted from a metal halide lamp, to give an aqueous ink-printable layer of approx. 15 μm.

Thus, an optical information re(which contained an acrylate monomer, prepolymer, a photopolymerization initiator, and a pigment consisting essentially of zinc sulfide particles). cording disc of CD-R type according to the invention which was composed of a substrate disc, a recording dye layer, a metallic light-reflecting layer, a protective resin layer, a zinc sulfide-containing light-shielding layer, and an aqueous ink-printable layer, overlaid in order, was produced.

COMPARISON EXAMPLE 1

The procedures of Example 1 for preparing an optical information recording disc of CD-R type were repeated except for replacing the zinc sulfide-containing light-shielding layer with a titanium dioxide/talc-containing light-shielding layer (composed of acrylate monomer, prepolymer, photopolymerization initiator, titanium dioxide, and talc), to prepare an optical information recording disc of CD-R type for comparison.

Blur of Aqueous Ink on CD-R Medium

On the hydrophilic ink-printable layer of each CD-R medium of Example 1 and Comparison Example 1, a line of 1 cm width was printed using an aqueous black ink. The aqueous black ink was supplied by means of an ink jet printer. The printed ink was observed with respect to the formation of blur spreading on width direction of the line just after the printing was performed, and at 96 hours kept at 40° C., 85% RH.

The printer is as follows:

(a) CP1000 (Expert Magnetics Co., Ltd.)

(b) CD-R Color Printer Signature (Fargo Corp.)

The printing mode is as follows:

(1) Super fine mode (for specifically prepared paper sheet)

(2) Standard mode (for ordinary paper sheet)

The evaluation of blur was made by measuring spread width (in terms of mm) of the line of printed ink.

The results are set forth in Table 1.

TABLE 1

| | Printing Conditions | | |
|---|---|---|---|
| | (a)-(1) | (a)-(2) | (b)-(1) |
| Example 1 | | | |
| Just after printed | 0 | 0 | 0 |
| After 96 hrs. | 0.6 | 0.6 | 0.3 |
| Comparison Example 1 | | | |
| Just after printed | 0 | 0 | 0.1 |
| After 96 hrs. | 1.2 | 1.2 | 1.3 |

The results set forth in Table 1 indicate that the optical information recording disc of the invention (Example 1) which has a zinc sulfide-containing light-shielding layer between the protective resin layer and the ink-printable layer gives a clear line image having no blur of the printed ink just after the printing is complete, and gives little blur even after it is stored for a long term under high temperature/high humidity conditions. In contrast, the optical information recording disc for comparison (Comparison Example 1) having a titanium dioxide/talc-containing light-shielding layer gives noticeable blur after a long term storage under high temperature/high humidity conditions.

What is claimed is:

1. An optical information recording medium comprising a transparent substrate, an information recording layer, a metallic light-reflecting layer, a light-shielding layer, and an ink-printable layer, in order, wherein the light-shielding layer comprises a binder polymer binder and zinc sulfide particles.

2. The optical information recording medium of claim 1, wherein the zinc sulfide particles have a mean particle size of 0.05 to 5 μm.

3. The optical information recording medium of claim 2, wherein the zinc sulfide particles have a mean particle size of 0.1 to 1.0 μm.

4. The optical information recording medium of claim 1, wherein the binder polymer is a cured ultraviolet light-curing resin.

5. The optical information recording medium of claim 1, wherein the binder polymer and the zinc sulfide particles are present in the light-shielding layer in a ratio of 10:90 to 50:50.

6. The optical information recording medium of claim 1, wherein the light-shielding layer has a thickness of 8.0 to 11.5 μm.

7. The optical information recording medium of claim 1, wherein the light-shielding layer has a thickness of 8.0 to 10.0 μm.

8. The optical information recording medium of claim 1, wherein the ink-printable layer is an aqueous ink-printable layer comprising a hydrophilic material and a binder polymer.

9. The optical information recording medium of claim 8, wherein the aqueous ink-printable layer comprises a cured ultraviolet light-curing resin and protein particles.

10. The optical information recording medium of claim 8, wherein the aqueous ink-printable layer has a thickness more than that of the light-shielding layer.

11. The optical information recording medium of claim 10, wherein the aqueous ink-printable layer has a thickness 1.6 to 2.5 times as much as the thickness of the light-shielding layer.

12. The optical information recording medium of claim 11, wherein the aqueous ink-printable layer has a thickness 1.7 to 2.0 times as much as the thickness of the light-shielding layer.

13. The optical information recording medium of claim 8, wherein the aqueous ink-printable layer has a thickness of 14.0 to 18.0 µm.

14. The optical information recording medium of claim 1, wherein the metallic light-reflecting layer comprises silver metal or silver alloy.

15. The optical information recording medium of claim 1, wherein the information recording layer comprises a laser light-sensitive dye.

16. The optical information recording medium of claim 1, wherein a protective resin layer is placed between the metallic light-reflecting layer and the light-shielding layer.

17. The optical information recording medium of claim 16, wherein a protective resin layer comprises a cured ultraviolet light-curing resin.

18. The optical information recording medium of claim 1, wherein the transparent substrate is a transparent disc substrate having a tracking spiral pregroove on its surface.

* * * * *